(12) United States Patent
Oike (10) Patent No.: US 11,323,673 B2
(45) Date of Patent: May 3, 2022

(54) METHOD FOR OPERATING CONTROL APPARATUS, AND PROJECTOR

(71) Applicant: SEIKO EPSON CORPORATION, Tokyo (JP)

(72) Inventor: Takumi Oike, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/128,497

(22) Filed: Dec. 21, 2020

(65) Prior Publication Data

US 2021/0195152 A1 Jun. 24, 2021

(30) Foreign Application Priority Data

Dec. 24, 2019 (JP) .............................. JP2019-232476

(51) Int. Cl.
*H04N 9/31* (2006.01)

(52) U.S. Cl.
CPC ......... *H04N 9/3182* (2013.01); *H04N 9/3155* (2013.01)

(58) Field of Classification Search
CPC .. H04N 9/3182; H04N 9/3194; H04N 9/3155; H04N 9/3105; H04N 9/31; H04N 5/57; H04N 17/04; H04N 17/00; H04N 9/3102; H04N 9/3197
USPC ....... 348/189, 739, 744, 758, 806, 807, 687; 382/260, 274, 276, 167, 162
See application file for complete search history.

(56) References Cited

U.S. PATENT DOCUMENTS

| | | | |
|---|---|---|---|
| 2004/0150795 A1 | 8/2004 | Ishii et al. | |
| 2004/0196303 A1 | 10/2004 | Matsuda | |
| 2005/0007390 A1 | 1/2005 | Yoshida et al. | |
| 2011/0279738 A1* | 11/2011 | Takahashi | H04N 9/3194 348/744 |
| 2017/0127028 A1 | 5/2017 | Oike et al. | |
| 2019/0268579 A1 | 8/2019 | Oike et al. | |

FOREIGN PATENT DOCUMENTS

| | | |
|---|---|---|
| JP | 2004-109246 | 4/2004 |
| JP | 2004-228948 | 8/2004 |
| JP | 2004-333758 | 11/2004 |
| JP | 2006-060527 | 3/2006 |
| JP | 2017-083672 | 5/2017 |
| WO | WO03/103298 | 12/2003 |

* cited by examiner

*Primary Examiner* — Sherrie Hsia
(74) *Attorney, Agent, or Firm* — Dority & Manning, P.A.

(57) ABSTRACT

A method for operating a control apparatus that controls a projector includes causing the projector to project a first image on a display surface, generating brightness information based on captured image data generated by causing an image sensor to capture an image of the first image on the display surface via a bandpass filter, and generating color correction data for correcting the colors of an image projected by the projector based on the brightness information. The bandpass filter includes a first bandpass filter that transmits the red light, a second bandpass filter that transmits the green light, and a third bandpass filter that transmits the blue light, and the wavelength region of the light that the first bandpass filter transmits, the wavelength region of the light that the second bandpass filter transmits, and the wavelength region of the light that the third bandpass filter transmits are separate from one another.

9 Claims, 8 Drawing Sheets

METHOD FOR OPERATING CONTROL APPARATUS, AND PROJECTOR

The present application is based on, and claims priority from JP Application Serial Number 2019-232476, filed Dec. 24, 2019, the disclosure of which is hereby incorporated by reference herein in its entirety.

BACKGROUND

1. Technical Field

The present disclosure relates to a method for operating a control apparatus, a method for controlling a projector, and a projector.

2. Related Art

JP-A-2004-228948 describes a technology for generating correction data for correcting the colors of an image projected by a projector. The technology allows generation of the correction data based on captured image data generated when an imaging section captures a red image, a green image, and a blue image projected by the projector at timings different from one another.

According to the technology described in JP-A-2004-228948, since the projector projects the red image, the green image, and the blue image at timings different from one another, it takes time to generate the correction data.

SUMMARY

A method for operating a control apparatus according to an aspect of the present disclosure relates to a method for operating a control apparatus that controls a projector that generates red light, green light, and blue light, the method including causing the projector to project a first image generated by the red light, the green light, and the blue light on a display surface, generating brightness information representing brightness of the red light, brightness of the green light, and brightness of the blue light based on captured image data generated by causing an image sensor to capture an image of the first image on the display surface via a bandpass filter that transmits the red light, the green light, and the blue light separately from one another, and generating color correction data for correcting colors of an image projected by the projector based on the brightness information. The bandpass filter includes a first bandpass filter that transmits the red light, a second bandpass filter that transmits the green light, and a third bandpass filter that transmits the blue light, and a wavelength region of the light that the first bandpass filter transmits, a wavelength region of the light that the second bandpass filter transmits, and a wavelength region of the light that the third bandpass filter transmits are separate from one another.

A method for operating a control apparatus according to another aspect of the present disclosure relates to a method for operating a control apparatus that controls a projector that generates red light, green light, and blue light, the method including causing the projector to project a second image on a display surface, causing the projector to project a third image on the display surface when the second image is not projected, generating brightness information representing brightness of the red light, brightness of the green light, and brightness of the blue light based on first captured image data generated by causing an image sensor to capture an image of the second image on the display surface via a bandpass filter that transmits the red light, the green light, and the blue light separately from one another and second captured image data generated by causing the image sensor to capture an image of the third image on the display surface via the bandpass filter, and generating color correction data for correcting colors of an image projected by the projector based on the brightness information. The bandpass filter includes a first bandpass filter that transmits the red light, a second bandpass filter that transmits the green light, and a third bandpass filter that transmits the blue light, and a wavelength region of the light that the first bandpass filter transmits, a wavelength region of the light that the second bandpass filter transmits, a wavelength region of the light that the third bandpass filter transmits are separate from one another, the second image contains two of the red light, the green light, and the blue light, and the third image contains one of the red light, the green light, and the blue light excluding the two of the red light, the green light, and the blue light which are contained the second image.

A projector according to another aspect of the present disclosure includes a light source, a light modulator that includes a first light modulator that modulates red light from the light source, a second light modulator that modulates green light from the light source, and a third light modulator that modulates blue light from the light source and generates image light, a projection system that projects the image light generated by the light modulator on a display surface, a camera that includes a bandpass filter and captures an image of the display surface on which the image light is projected to generate captured image data, and a processor that calculates a luminance-to-chromaticity characteristic of the light modulator based on the captured image data and calculates a color correction value, and the camera captures an image of the display surface on which the image light is projected via the bandpass filter with color components of the red light, the green light, and the blue light distinguished from one another to generate the captured image data.

DESCRIPTION OF EXEMPLARY EMBODIMENTS

A: First Embodiment

A1: Overview of Display System 1000

Figure 1:
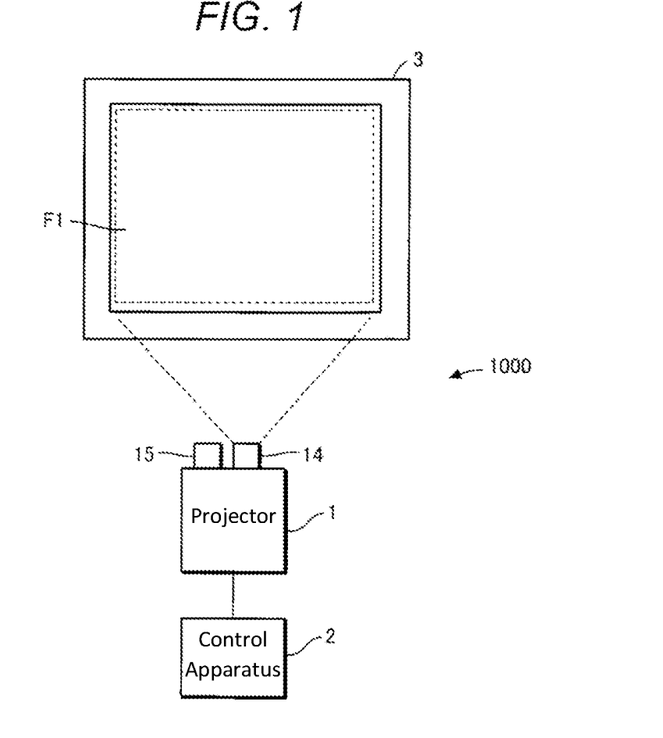
FIG. 1 shows an example of a display system.

FIG. 1 shows an example of a display system 1000. The display system 1000 includes a projector 1, a control apparatus 2, and a camera 15.

The projector 1 generates an image based on image information and projects the image on a display surface 3. For example, the projector 1 generates a projection image F1 based on a projection image information and projects the projection image F1 on the display surface 3. The projection image information represents, for example, a movie or an image for presentation. The projection image information may represent an image different from both a movie and an image for presentation. The display surface 3 is, for example, a screen. The display surface 3 is not limited to a screen and may, for example, be a whiteboard, a wall, a ceiling, a floor, or a door.

The projector 1 corrects the colors of the projection image F1 based on color correction data for image color correction. The projector 1 generates an image for correction based on correction image information for generating the color correction data and projects the image for correction on the display surface 3. The image for correction is an example of a first image.

The correction image information represents images in white having 8 grayscales from a grayscale of "0" to a grayscale of "7". The images in white are hereinafter referred to as "white images." The projector 1 can generate red light, green light, and blue light. The projector 1 generates the white images by using the red light, the green light, and the blue light. The white images each contain a red light component, a green light component, and a blue light component.

A white image having a lower grayscale is darker. The white image having the grayscale of "0" is a black image. The grayscale of "7" is the highest grayscale. The grayscales from "0" to "7" in the correction image information are associated with the lowest to highest grayscales in the projection image information. For example, when the lowest grayscale is "0" and the highest grayscale is "255" in the projection image information, the grayscale of "0" in the correction image information corresponds to the lowest grayscale of "0" in the projection image information, and the grayscale of "7" in the correction image information corresponds to the highest grayscale of "255" in the projection image information. The number of grayscales in the correction image information is not limited to "8" and can be changed as appropriate.

The correction image information contains a R signal representing red, a G signal representing green, and a B signal representing blue. That is, the correction image information is expressed by the RGB signals. The correction image information is not necessarily expressed by the RGB signals and may instead be image data in a YUV color space formed of a signal Y (luminance signal), a signal U (first color difference signal), and a signal V (second color difference signal), image data in a YCbCr color space, or image data in a YPbPr color space. For example, the correction image information may be expressed by the signals YUV or signals YCbCr. When the correction image information is not expressed by the RGB signals, the projector 1 converts the correction image information into the RGB signals.

The correction image information is stored in the projector 1. The correction image information may, for example, be supplied from the control apparatus 2 to the projector 1.

The control apparatus 2 is, for example, a PC (personal computer). The control apparatus 2 is not limited to a PC and may, for example, be a tablet terminal or a smartphone. The control apparatus 2 may be an apparatus incorporated in the projector 1.

The control apparatus 2 communicates with the projector 1, for example, via a wired LAN (local area network). The scheme of the communication between the control apparatus 2 and the projector 1 is not limited to a wired LAN and may, for example, be a wireless LAN or Bluetooth. Bluetooth is a registered trademark. The control apparatus 2 controls the projector 1.

Figure 2:
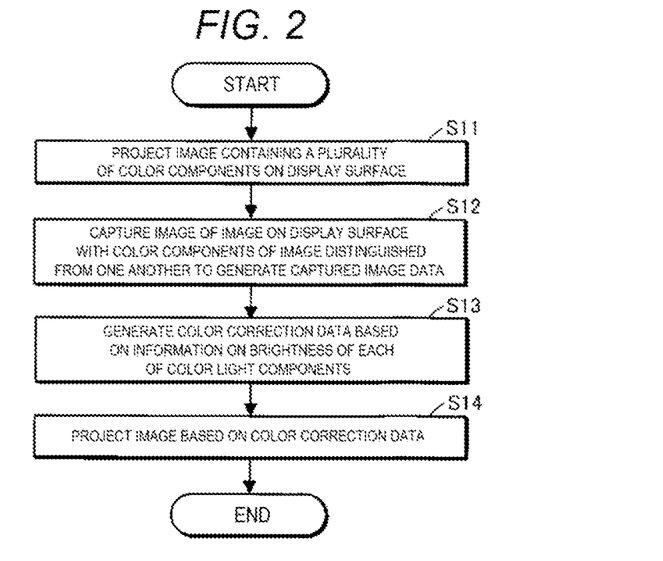
FIG. 2 schematically shows a color correction process carried out by the display system.

FIG. 2 schematically shows a color correction process carried out by the display system 1000.

In step S11, the projector 1 projects an image containing a plurality of color components on the display surface 3. In step S12, the camera 15 captures an image of the image on the display surface 3 with the color components of the image distinguished from one another to generate captured image data. In step S13, the control apparatus 2 generates information on the brightness of each of the color light components based on the captured image data and generates color correction data for correction of the colors of an image projected by the projector 1 based on the brightness information on each of the color light components. In step S14, the projector 1 projects an image based on the color correction data.

The control apparatus 2 may control the processes in steps S11 to S14. Instead, when the projector 1 has the functions of the control apparatus 2, the projector 1 may carry out the processes in steps S11 to S14. The camera 15 may be a component separate from the projector 1. When the projector 1 is configured to include the camera 15, capturing an image and analysis of the captured image data are readily performed.

The image containing a plurality of color light components is preferably a white image containing the red light component, the green light component, and the blue light component, and one image or one type of image is desirably projected. When two images or two type of image are projected, an image that does not contain one of the red, green, and blue light components and an image that contains a color light component that is not contained in the image may be used.

The camera 15 can capture an image of the image on the display surface 3 with the color components of the image distinguished from one another by using a bandpass filter 153 or by using, for example, a variable spectral filter and adjusting the imaging timing.

When the projector 1 projects at least white images, the color correction data can be generated. The color correction data can therefore be generated in a shorter period than the period required in the configuration in which the projector 1 projects a red image, a green image, and a blue image at timings different from one another to generate the color correction data.

A2: Example of Projector 1

Figure 3:
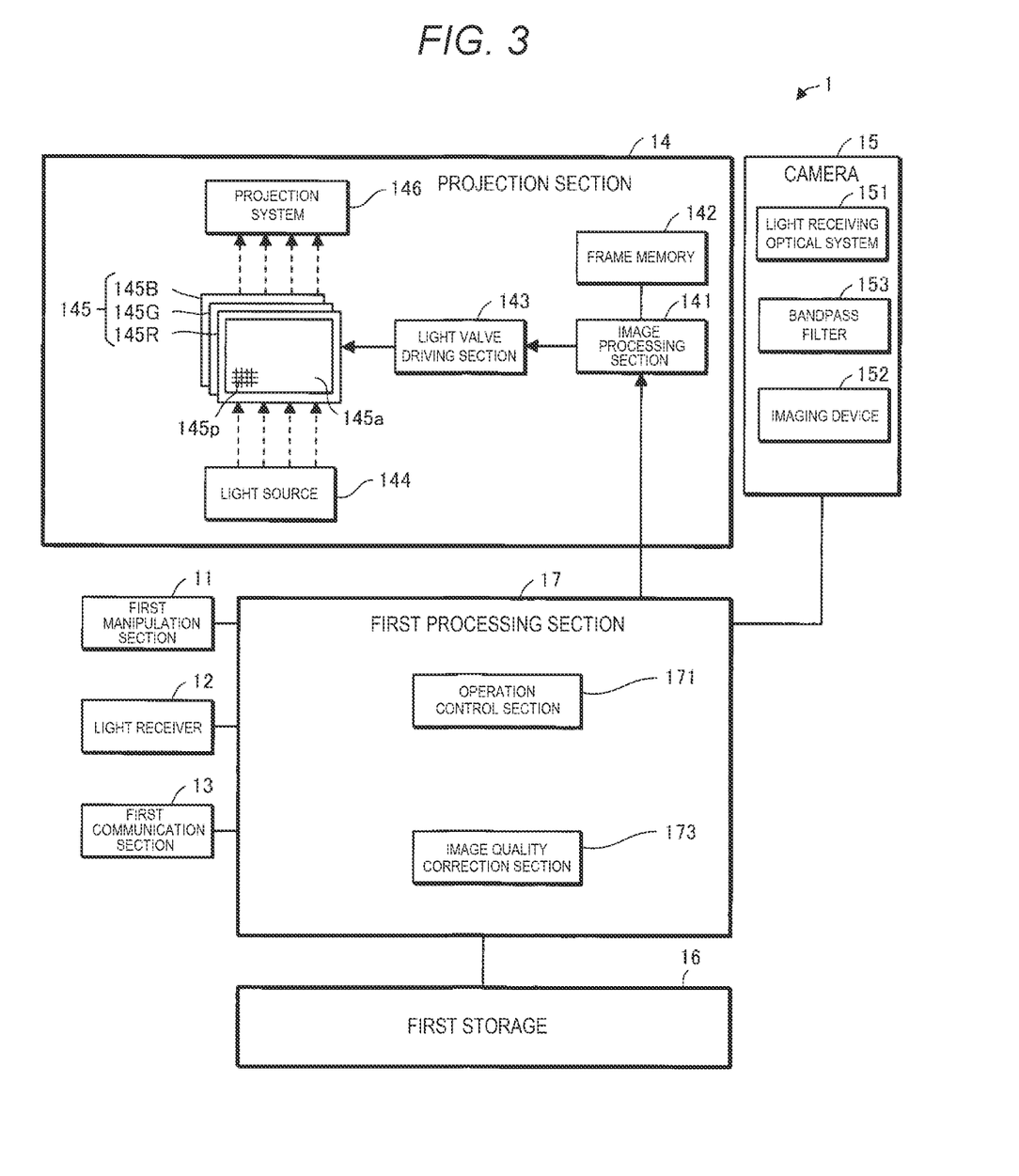
FIG. 3 shows an example of a projector.

FIG. 3 shows an example of the projector 1. The projector 1 includes a first manipulation section 11, a light receiver 12, a first communication section 13, a projection section 14, the camera 15, a first storage 16, and a first processing section 17.

The first manipulation section 11 is, for example, a variety of operation buttons or operation keys or a touch panel. The first manipulation section 11 is provided at the enclosure of the projector 1. The first manipulation section 11 receives a user's input manipulation.

The light receiver 12 receives from a remote control that is not shown an infrared signal based on the input manipulation performed on the remote control. The remote control includes a variety of operation buttons or operation keys or a touch panel that receives the input manipulation.

The first communication section 13 communicates with the control apparatus 2. The scheme of the communication between the first communication section 13 and the control apparatus 2 is a wired LAN, as described above. The scheme of the communication between the first communication section 13 and the control apparatus 2 is not limited to a wired LAN.

The projection section 14 projects an image on the display surface 3 to display the image on the display surface 3. The projection section 14 includes an image processing section 141, a frame memory 142, a light valve driving section 143, a light source 144, a liquid crystal light valve for red light 145R, a liquid crystal light valve for green light 145G, a liquid crystal light valve for blue light 145B, and a projection system 146. The liquid crystal light valve for red light 145R, the liquid crystal light valve for green light 145G, and the liquid crystal light valve for blue light 145B are hereinafter referred to as "liquid crystal light valves 145" when they do not need to be distinguished from one another.

The image processing section 141 is formed of a circuit, such as one or more image processors. The image processing section 141 receives image information from the first processing section 17. The image information is, for example, the projection image information. The image information may be the correction image information.

The image processing section 141 develops the image information in the frame memory 142. The frame memory 142 is formed, for example, of a storage, such as a RAM (random access memory). The image processing section 141 performs image processing on the image information developed in the frame memory 142 to generate a drive signal.

The image processing performed by the image processing section 141 includes, for example, a color correction process of correcting the colors of an image projected by the projection section 14.

The light valve driving section 143 is formed, for example, of a circuit, such as a driver. The light valve driving section 143 generates drive voltage based on the drive signal provided from the image processing section 141. The light valve driving section 143 applies the drive voltage to the liquid crystal light valves 145 to drive the liquid crystal light valves 145.

The light source 144 is, for example, an LED (light emitting diode). The light source 144 is not limited to an LED and may, for example, be a xenon lamp, an ultrahigh-pressure mercury lamp, or a laser light source. The light source 144 outputs light. The light outputted from the light source 144 enters an optical integration system that is not shown. The optical integration system reduces variation in the luminance distribution of the light incident thereon. Having passed through the optical integration system, the light outputted from the light source 144 is separated by a color separation system that is not shown into the red, green, and blue light components, which are the three primary colors of light. The red light component is incident on the liquid crystal light valve for red light 145R. The green light component is incident on the liquid crystal light valve for green light 145G. The blur light component is incident on the liquid crystal light valve for blue light 145B.

The liquid crystal light valves 145 are each formed, for example, of a liquid crystal panel formed of a pair of transparent substrates with a liquid crystal material present therebetween. The liquid crystal light valves 145 each have a rectangular pixel region 145a including a plurality of pixels 145p arranged in a matrix. In the liquid crystal light valves 145, the drive voltage based on the image information is applied to the liquid crystal material for each of the pixels 145p. When the light valve driving section 143 applies the drive voltage to each of the pixels 145p, the light transmittance of the light passing through the pixel 145p is set at light transmittance based on the drive voltage. The light outputted from the light source 144 is modulated when passing through the pixel region 145a. An image based on the image information is thus formed on a color light component basis. Specifically, the liquid crystal light valve for red light 145R generates an image formed of the red light. The liquid crystal light valve for green light 145G generates an image formed of the green light. The liquid crystal light valve for blue light 145B generates an image formed of the blue light. The liquid crystal light valve for red light 145R, the liquid crystal light valve for green light 145G, and the liquid crystal light valve for blue light 145B form a light modulator, and the liquid crystal light valve for red light 145R, the liquid crystal light valve for green light 145G, and the liquid crystal light valve for blue light 145B are examples of a first light modulator, a second light modulator, and a third light modulator, respectively.

The color images formed by the liquid crystal light valve for red light 145R, the liquid crystal light valve for green light 145G, and the liquid crystal light valve for blue light 145B are combined with one another for each of the pixels 145p by a color combining system that is not shown. Image light carrying a color image is thus generated. The color image is projected via the projection system 146. The images formed of the combined color light components can instead be projected in the form of a monochromatic image.

The camera 15 includes alight receiving optical system 151, such as a lens, an imaging device 152, and the bandpass filter 153. The bandpass filter 153 is located between the light receiving optical system 151 and the imaging device 152. The bandpass filter 153 transmits the red light, the green light, and the blue light separately from each other. The red light, the green light, and the blue light having passed through the bandpass filter 153 are each incident on the imaging device 152. The imaging device 152 captures an image of the image on the display surface 3 via the bandpass filter 153 to generate captured image data. For example, the imaging device 152 captures an image of a white image on the display surface 3 via the bandpass filter 153 to generate correction image captured image data. The camera 15 is an example of an imaging section.

The camera 15 may be provided as a component separate from the projector 1. In this case, the camera 15 and the projector 1 are so coupled to each other via a wired or wireless interface as to be capable of data transmission and reception.

The first storage 16 is a recording medium readable by the first processing section 17. The first storage 16 includes, for example, a nonvolatile memory and a volatile memory. The nonvolatile memory is, for example, a ROM (read only memory), an EPROM (erasable programmable read only memory), or an EEPROM (electrically erasable programmable read only memory). The volatile memory is, for example, a RAM.

The first storage 16 stores a program executed by the first processing section 17, a variety of data used by the first processing section 17, and other pieces of information.

The first processing section 17 is formed, for example, of one or more processors. As an example, the first processing section 17 is formed of one or more CPUs (central processing units). Part or entirety of the functions of the first processing section 17 may be achieved, for example, by a circuit, such as a DSP (digital signal processor), an ASIC (application specific integrated circuit), a PLD (programmable logic device), or an FPGA (field programmable gate array). The first processing section 17 concurrently or successively carries out a variety of processes. The first processing section 17 reads the program from the first storage 16. The first processing section 17 executes the program to achieve an operation control section 171 and an image quality correction section 173.

The operation control section 171 controls a variety of operations of the projector 1. For example, the operation control section 171 controls the first communication section 13, the projection section 14, and the camera 15. As an example, the operation control section 171 causes the projection section 14 to project an image. The operation control section 171 causes the camera 15 to capture an image. The operation control section 171 causes the first communication section 13 to transmit the captured image data, for example, the correction image captured image data to the control apparatus 2. The operation control section 171 controls calibration operation described later. The operation control section 171 may be formed of a circuit, such as one or more operation controllers.

The image quality correction section 173 corrects the quality of an image projected from the projection section 14. The image quality correction section 173, for example, causes the image processing section 141 to correct the projection image information based on the color correction data to correct the colors of a projection image indicated by the projection image information from colors indicated by the projection image information before the correction to colors indicated by the projection image information after the correction. The image quality correction section 173 may be formed of a circuit, such as one or more image quality correctors.

A3: Examples of Imaging Device 152 and Bandpass Filter 153

Figure 4:
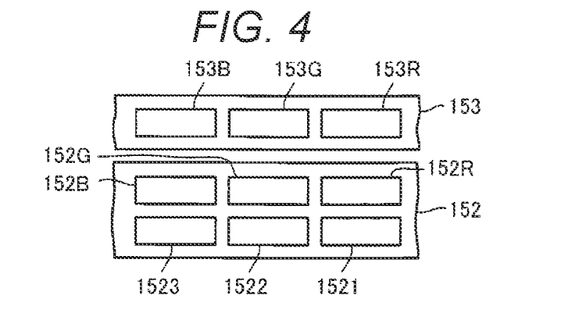
FIG. 4 shows examples of part of an imaging device and part of a bandpass filter.

FIG. 4 shows examples of part of the imaging device 152 and part of the bandpass filter 153.

The bandpass filter 153 includes a first bandpass filter 153R, a second bandpass filter 153G, and a third bandpass filter 153B. The first bandpass filter 153R, the second bandpass filter 153G, and the third bandpass filter 153B do not overlap with one another in the direction from the light receiving optical system 151 toward the imaging device 152.

The first bandpass filter 153R transmits the red light. The second bandpass filter 153G transmits the green light. The third bandpass filter 153B transmits the blue light.

The imaging device 152 is an image sensor with color filters and outputs an electric signal as a measured value on a pixel basis. The imaging device 152 may instead be an image sensor with no color filter. The image sensor is, for example, a CCD (charge coupled device) image sensor. The image sensor is not limited to a CCD image sensor and may, for example, be a CMOS (complementary metal oxide semiconductor) image sensor.

The imaging device 152 includes a red filter 152R, a green filter 152G, a blue filter 152B, a first optical sensor 1521, a second optical sensor 1522, and a third optical sensor 1523. The red filter 152R, the green filter 152G, and the blue filter 152B are each a color filter. The first optical sensor 1521, the second optical sensor 1522, and the third optical sensor 1523 are part of the image sensor.

The red filter 152R transmits the red light having passed through the first bandpass filter 153R. The first optical sensor 1521 converts the red light having passed through the red filter 152R into an electric signal. The first optical sensor 1521 forms a pixel for red light measurement.

The green filter 152G transmits the green light having passed through the second bandpass filter 153G. The second optical sensor 1522 converts the green light having passed through the green filter 152G into an electric signal. The second optical sensor 1522 forms a pixel for green light measurement.

The blue filter 152B transmits the blue light having passed through the third bandpass filter 153B. The third optical sensor 1523 converts the blue light having passed through the blue filter 152B into an electric signal. The third optical sensor 1523 forms a pixel for blue light measurement.

A4: Characteristics of Bandpass Filter 153 and Spectral Sensitivity of Camera 15

Figure 5:
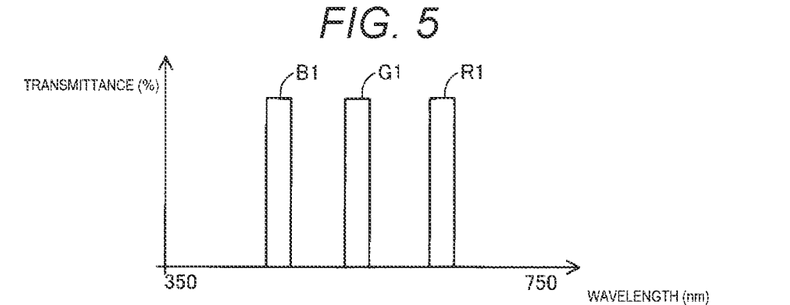
FIG. 5 shows an example of the filter characteristics of the bandpass filter.

FIG. 5 shows an example of the filter characteristics of the bandpass filter 153. A wavelength region R1 of the light passing through the first bandpass filter 153R, a wavelength region G1 of the light passing through the second bandpass filter 153G, and a wavelength region B1 of the light passing through the third bandpass filter 153B are separate from one another, as shown in FIG. 5 by way of example.

The wavelength region R1, the wavelength region G1, and the wavelength region B1 are not limited to the wavelength regions shown by way of example in FIG. 4 as long as the wavelength region R1 contains part of the wavelength region of the red lights, the wavelength region G1 contains part of the wavelength region of the green light, and the wavelength region B1 contains part of the wavelength region of the blue light.

Figure 6:
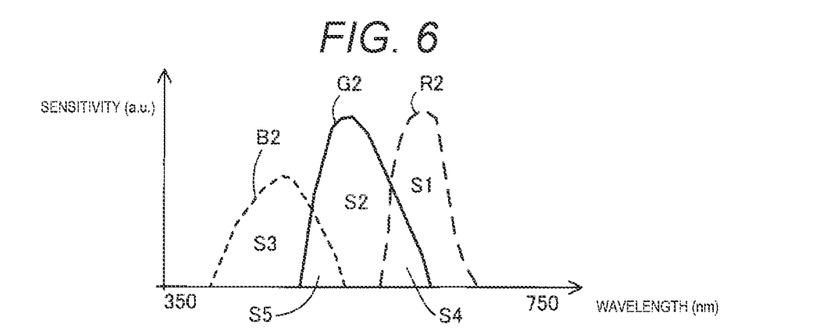
FIG. 6 shows an example of the spectral sensitivity of a camera with the bandpass filter omitted.

FIG. 6 shows an example of the spectral sensitivity of the camera 15 with the bandpass filter 153 omitted. The spectral sensitivity shown in FIG. 6 illustrates the spectral sensitivity of a typical camera. In the camera 15 with the bandpass filter 153 omitted, part of spectral sensitivity R2 of the pixels for red light measurement overlaps with part of spectral sensitivity G2 of the pixels for green light measurement, as shown in FIG. 6 by way of example. The red light and the green light cannot therefore be precisely separated from the white image. Further, in the camera 15 with the bandpass filter 153 omitted, part of spectral sensitivity B2 of the pixels for blue light measurement overlaps with part of the spectral sensitivity G2 of the pixels for green light measurement. The blue light and the green light cannot therefore be precisely separated from the white image.

Figure 7:
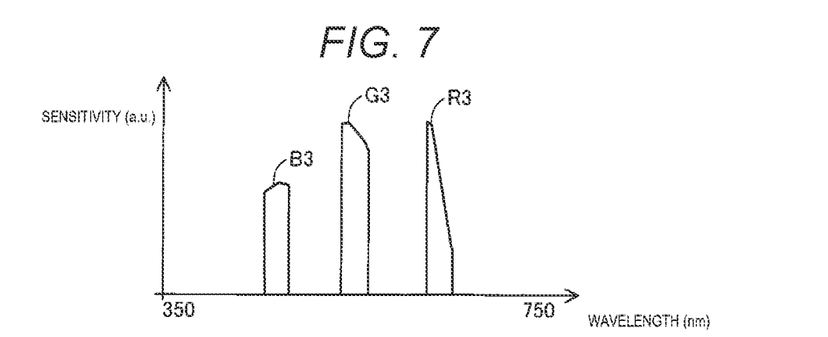
FIG. 7 shows an example of the spectral sensitivity of the camera provided with the bandpass filter.

FIG. 7 shows an example of the spectral sensitivity of the camera 15 provided with the bandpass filter 153. In the camera 15 provided with the bandpass filter 153, spectral sensitivity R3 of the pixels for red light measurement, spectral sensitivity G3 of the pixels for green light measurement, and spectral sensitivity B3 of the pixels for blue light measurement are separate from one another, as shown in FIG. 7 by way of example. The red light, the blue light, and the green light can therefore be precisely separated from the white image.

The situation in which the wavelength region R1, the wavelength region G1, and the wavelength region B1 are separate from one another includes, for example, a case where the wavelength region R1, the wavelength region G1, and the wavelength region B1 can be considered to be separate from one another as long as a variety of errors of the bandpass filter 153, such as manufacturing errors, are negligible.

In FIG. 6, let $S_R$ be the area of a region S1 defined by the spectral sensitivity R2 of the pixels for red light measurement and the horizontal axis, $S_G$ be the area of a region S2 defined by the spectral sensitivity G2 of the pixels for green light measurement and the horizontal axis, $S_B$ be the area of a region S3 defined by the spectral sensitivity B2 of the pixels for blue light measurement and the horizontal axis, $S_RG$ be the area of a portion S4, where the regions S1 and S2 overlap with each other, and $S_{GB}$ be the area of a portion S5, where the regions S2 and S3 overlap with each other.

In this case, when a first condition below is satisfied, it can be considered that the wavelength regions R1, G1, and B1 are separate from one another.

The first condition is a condition under which $S_{RG} \leq S_R*0.05$, $S_{RG} \leq S_G*0.05$, $S_{GB} \leq S_G*0.05$, and $S_{GB} \leq S_B*0.05$ are satisfied.

Also when a second condition below is satisfied, it can be considered that the wavelength regions R1, G1, and B1 are separate from one another.

It is now defined that the state in which the projector 1 projects a red image on the display surface 3 is a red image displayed state, and let RR1 be the value outputted from the pixels for red light measurement when the red image is captured in the red image displayed state, RG1 be the value outputted from the pixels for green light measurement when the red image is captured in the red image displayed state, and RB1 be the value outputted from the pixels for blue light measurement when the red image is captured in the red image displayed state.

It is further defined that the state in which the projector 1 projects a green image on the display surface 3 is a green image displayed state, and let GR1 be the value outputted from the pixels for red light measurement when the green image is captured in the green image displayed state, GG1 be the value outputted from the pixels for green light measurement when the green image is captured in the green image displayed state, and GB1 be the value outputted from the pixels for blue light measurement when the green image is captured in the green image displayed state.

It is further defined that the state in which the projector 1 projects a blue image on the display surface 3 is a blue image displayed state, and let BR1 be the value outputted from the pixels for red light measurement when the blue image is captured in the blue image displayed state, BG1 be the value outputted from the pixels for green light measurement when the blue image is captured in the blue image displayed state, and BB1 be the value outputted from the pixels for blue light measurement when the blue image is captured in the blue image displayed state.

The second condition is a condition under which $RG1 \leq RR1*0.05$, $RB1 \leq RR1*0.05$, $GR1 \leq GG1*0.05$, $GB1 \leq GG1*0.05$, $BR1 \leq BB1*0.05$, and $BG1 \leq BB1*0.05$ are satisfied.

A5: Example of Control Apparatus 2

Figure 8:
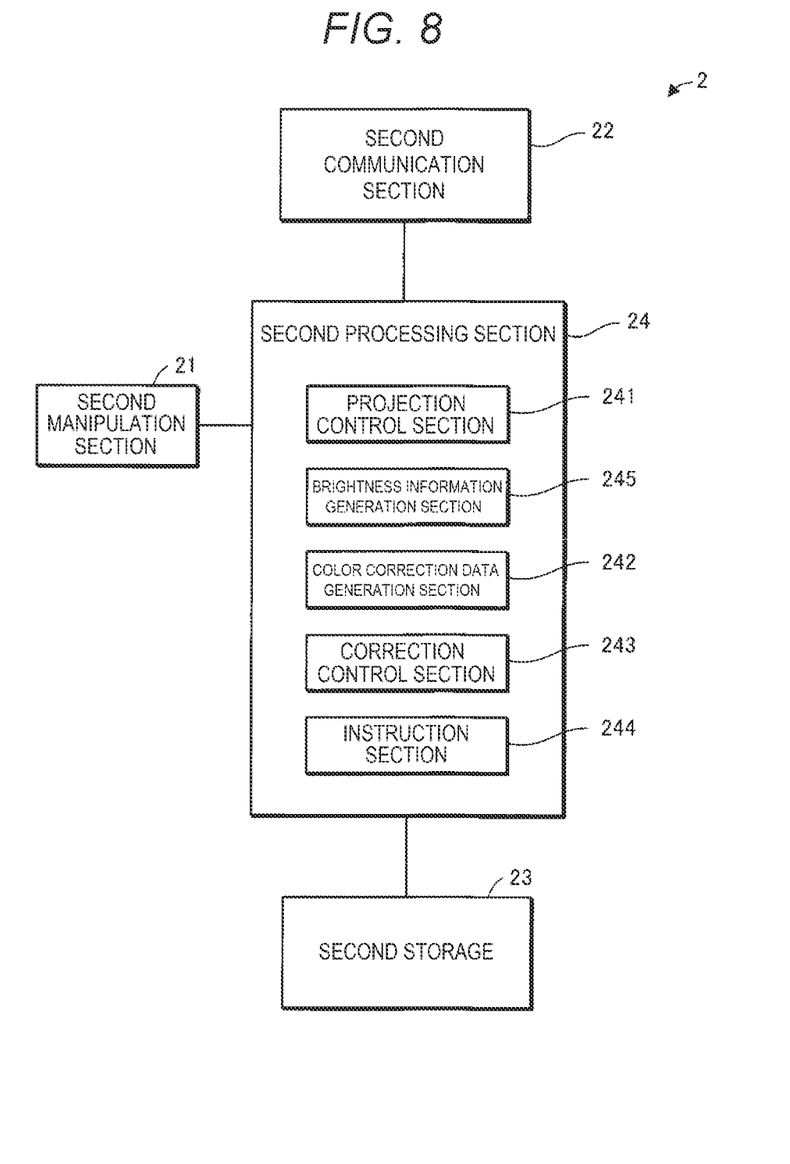
FIG. 8 shows an example of a control apparatus.

FIG. 8 shows an example of the control apparatus 2. The control apparatus 2 includes a second manipulation section 21, a second communication section 22, a second storage 23, and a second processing section 24.

The second manipulation section 21 is, for example, a keyboard, operation buttons, or a touch panel. The second manipulation section 21 receives the user's input manipulation.

The second communication section 22 communicates with the projector 1. Specifically, the second communication section 22 communicates with the first communication section 13 via a wired LAN. The scheme of the communication between the second communication section 22 and the first communication section 13 is not limited to a wired LAN. The second communication section 22 receives, for example, the correction image captured image data.

The second storage 23 is a recording medium readable by the second processing section 24. The second storage 23 includes, for example, a nonvolatile memory and a volatile memory. The second storage 23 stores a program executed by the second processing section 24 and a variety of data used by the second processing section 24.

The second processing section 24 is formed, for example, of one or more processors. As an example, the second processing section 24 is formed of one or more CPUs. Part or entirety of the functions of the second processing section 24 may be achieved, for example, by a circuit, such as a DSP, an ASIC, a PLD, or an FPGA. The second processing section 24 concurrently or successively carries out a variety of processes. The second processing section 24 reads the program from the second storage 23.

The second processing section 24 executes the program read from the second storage 23 to achieve a projection control section 241, a brightness information generation section 245, a color correction data generation section 242, a correction control section 243, and an instruction section 244. The second processing section 24 is an example of a correction section.

The projection control section 241 controls the projection performed by the projector 1. For example, the projection control section 241 causes the projector 1 to project a white image based on the correction image information on the display surface 3. The projection control section 241 may be formed of a circuit, such as one or more projection controllers.

The brightness information generation section 245 generates brightness information representing the brightness of the red light, the brightness of the green light, and the brightness of the blue light based on the correction image captured image data. The brightness information is an example of luminance/chromaticity characteristics of the light modulator. The brightness information generation section 245 may be formed of a circuit, such as one or more brightness information generators.

The color correction data generation section 242 generates the color correction data. For example, the color correction data generation section 242 generates the color correction data based on the bright information. The color correction data is an example of a color correction value. The color correction data generation section 242 may be formed of a circuit, such as one or more color correction data generators.

The correction control section 243 causes the projector 1 to perform correction using the color correction data. For example, the correction control section 243 provides the projector 1 with the color correction data via the second communication section 22 to cause the projector 1 to perform the correction using the color correction data. The correction control section 243 may be formed of a circuit, such as one or more correction controllers.

The instruction section 244 sends an instruction to the projector 1. As an example, the instruction section 244 sends an instruction of performing calibration operation that associates imaging coordinates in the captured image data generated by the camera 15 with panel coordinates in the liquid crystal light valves 145 to the projector 1 via the second communication section 22. The instruction section 244 may be formed, for example, of an instruction circuit. The calibration associates the pixels in the camera 15 with the pixels in each of the liquid crystal light valves 145. The pixels in each of the liquid crystal light valves 145 correspond to the pixels of the image on the display surface 3. The calibration associates, for example, three pixels for color light measurement, a pixel for red light measurement, a pixel for green light measurement, and a pixel for blue light measurement, with one pixel in each of the liquid crystal light valves 145, whereby the red, green, and blue light components can be measured distinguishably from one another.

A6: Calibration Operation

Figure 9:
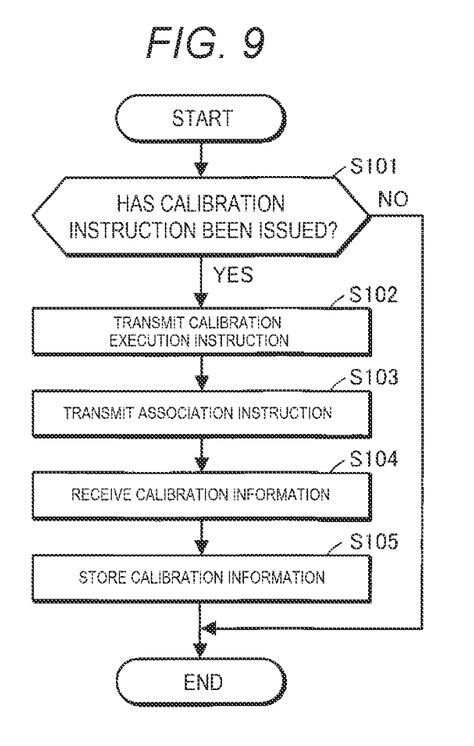
FIG. 9 is a flowchart for describing calibration operation.

FIG. 9 is a flowchart for describing the calibration operation that associates the imaging coordinates with the panel coordinates. When the second manipulation section 21 of the control apparatus 2 receives in step S101 a calibration execution instruction that instructs execution of the calibration operation, the instruction section 244 transmits the calibration execution instruction to the projector 1 in step S102 via the second communication section 22.

In the projector 1, when the first communication section 13 receives the calibration execution instruction, the operation control section 171 causes the projection section 14 to project a calibration pattern image on the display surface 3. The calibration pattern image is, for example, a lattice pattern. Predetermined marks are formed at the four corners of the calibration pattern image. The predetermined marks are used to detect the four corners of the calibration pattern image. When the first storage 16 stores pattern image information representing the calibration pattern image, the operation control section 171 reads the pattern image information from the first storage 16. The operation control section 171 outputs the pattern image information to the image processing section 141 to cause the projection section 14 to project the calibration pattern image on the display surface 3.

Having transmitted the calibration execution instruction, the instruction section 244 transmits an association instruction to the projector 1 via the second communication section 22 in step S103.

In the projector 1, when the first communication section 13 receives the association instruction, the operation control section 171 causes the camera 15 to perform imaging. The camera 15 performs the imaging to generate captured image data representing the calibration pattern image. The operation control section 171 associates the imaging coordinates in the captured image data with the panel coordinates in each of the liquid crystal light valves 145. Specifically, the operation control section 171 first detects the marks in the calibration pattern image indicated by the captured image data. The operation control section 171 subsequently identifies the positions of the pixels representing the marks of the calibration pattern image in the captured image data. The operation control section 171 subsequently identifies the positions of the pixels representing the marks of the calibration pattern image in each of the liquid crystal light valves 145. The operation control section 171 subsequently generates calibration information that associates the positions of the pixels representing the marks of the calibration pattern image in the captured image data with the positions of the pixels representing the marks of the calibration pattern image in each of the liquid crystal light valves 145. The imaging coordinates and the panel coordinates are thus associated with each other. The calibration information can also be referred to as coordinate conversion information.

The positions of the pixels representing the marks in each of the liquid crystal light valves 145 may, for example, be stored in the first storage 16 in advance. In this case, the operation control section 171 may acquire the positions of the pixels representing the marks in each of the liquid crystal light valves 145 from the first storage 16.

When the image processing section 141 develops the calibration pattern image in the frame memory 142, the operation control section 171 may identify the positions of the pixels representing the marks in each of the liquid crystal light valves 145 based on the positions of the pixels representing the marks in the frame memory 142. In this case, the first storage 16 stores in advance position association information that associates the positions of the pixels in the frame memory 124 with the positions of the pixels in each of the liquid crystal light valves 145. The operation control section 171 uses the position association information to identify the positions of the pixels representing the marks in each of the liquid crystal light valves 145 based on the positions of the pixels representing the marks in the frame memory 142.

The operation control section 171 subsequently transmits the calibration information to the control apparatus 2 via the first communication section 13.

When the second communication section 22 receives the calibration information from the projector 1 in step S104, the instruction section 244 stores the calibration information in the second storage 23 in step S105.

A7: Operation of Generating Color Correction Data

Figure 10:
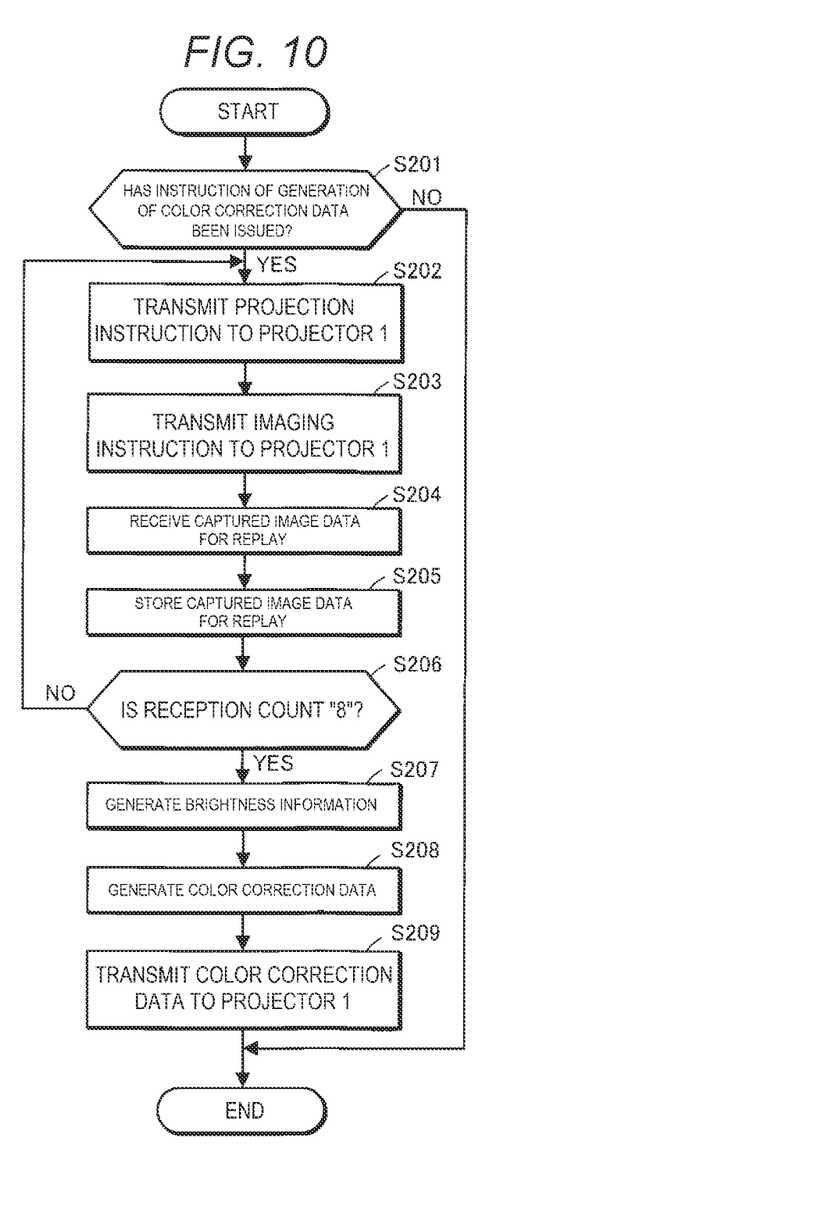
FIG. 10 describes operation of generating color correction data performed by the control apparatus.

FIG. 10 describes operation of generating the color correction data performed by the control apparatus 2. When the second manipulation section 21 of the control apparatus 2 receives an instruction of generation of the color correction data in step S201, the projection control section 241 transmits a projection instruction of projection of a white image not having been selected from a plurality of white images indicated by the correction image information to the projector 1 via the second communication section 22 in step S202.

In the projector 1, when the first communication section 13 receives the projection instruction, the image correction section 173 counts the number of received projection instructions. The count of the number of received projection instructions is hereinafter referred to as a "reception count." The initial value of the reception count is "0". The reception count is incremented by "1" whenever the projection instruction is received.

In the present embodiment, the reception counts ranging from "1" to "7" are associated with the white images having the grayscales ranging from "1" to "7", respectively. The reception counts "8" is associated with the white image having the grayscale of "0", that is, the black image.

The white images having the grayscales ranging from "0" to "7" are expressed by the combination of the grayscales of the R signal, the grayscales of the G signal, and the grayscales of the signal B (R/G/B). Specifically, the white images having the grayscales ranging from "0" to "7" are expressed by (R/G/B)=(0/0/0), (36/36/36), (72/72/72), (109/109/109), (145/145/145), (182/182/182), (218/218/218), and (255/255/255), respectively.

The association between the reception count and the white image is indicated in the association information. The association information is stored in the first storage 16 of the projector 1 and the second storage 23 of the control apparatus 2.

In the projector 1, the image quality correction section 173 subsequently refers to the association information to identify the white image associated with the reception count as a projection target image from the plurality of white images indicated by the correction image information. For example, when the reception count is "1", the image quality correction section 173 identifies the white image having the grayscale of "1" as the projection target image.

In the projector 1, the image quality correction section 173 subsequently reads image information representing the projection target image as projection target image information from the correction image information stored in the first storage 16. For example, when the projection target image is the white image having the grayscale of "1", the image quality correction section 173 reads image information representing the white image having the grayscale of "1" as the projection target image information from the correction image information.

In the projector 1, the image quality correction section 173 subsequently outputs the projection target image information to the image processing section 141 to cause the projection section 14 to project the projection target image on the display surface 3. For example, when the projection target image information is image information representing the white image having the grayscale of "1", the image quality correction section 173 causes the projection section 14 to project the white image having the grayscale of "1" on the display surface 3.

Having transmitted the projection instruction, the projection control section 241 transmits an imaging instruction to the projector 1 via the second communication section 22 in step S203.

In the projector 1, when the first communication section 13 receives the imaging instruction, the image quality correction section 173 causes the imaging device 152 to capture an image of the white image on the display surface 3 via the bandpass filter 153. The imaging device 152 performs the imaging to generate the correction image captured image data. The image quality correction section 173 adds the reception count to the correction image captured image data to generate captured image data for reply. The image quality correction section 173 transmits the captured image data for reply to the control apparatus 2 via the first communication section 13. When captured image data for replay having the reception count of "8" is transmitted to the control apparatus 2 via the first communication section 13, the image quality correction section 173 sets the reception count back at "0".

When the second communication section 22 receives the captured image data for replay from the projector 1 in step S204, the projection control section 241 stores the captured image data for replay in the second storage 23 in step S205.

The projection control section 241 subsequently evaluates in step S206 whether or not the reception count indicated by the latest captured image data for replay is "8", which is the number of white images indicated by the correction image information. That is, the evaluation in step S206 means evaluation of whether or not captured image data on all the eight white images indicated by the correction image information have been produced.

When the reception count indicated by the latest captured image data for replay is not "8", the control returns to the process in step S202.

When the reception count indicated by the latest captured image data for replay is "8", the brightness information generation section 245 generates the brightness information in step S207. An example of the generation of the brightness information will be described later.

The color correction data generation section 242 subsequently generates the color correction data based on the brightness information in step S208. An example of the generation of the color correction data will be described later.

The correction control section 243 subsequently transmits the color correction data to the projector 1 via the second communication section 22 in step S209. The correction control section 243 then deletes the captured image data for replay from the second storage 23.

In the projector 1, when the first communication section 13 receives the color correction data, the image quality correction section 173 stores the color correction data in the first storage 16. The image quality correction section 173 causes the image processing section 141 to correct the projection image information based on the color correction data to correct the colors of the projection image from colors indicated by the projection image information before the correction to the colors indicated by the projection image information after the correction.

A8: Example of Generation of Brightness Information

An example of the generation of the brightness information performed by the control apparatus 2 will next be described. The brightness information generation section 245 uses the calibration information associated with the projector 1 to identify a pixel region representing the white image from the captured image data for replay whenever the captured image data for replay is received.

The brightness information generation section 245 subsequently detects the pixel values in the identified region in the white image, specifically, RGB values in the identified region whenever the captured image data for replay is received. The identified region in the white image is, for example, a region formed of horizontal 20 pixels×vertical 20 pixels including the center of the white image. The identified region in the white image is not limited to the region described above and can be changed as appropriate.

The brightness information generation section 245 subsequently calculates the average of the RGB values in the identified region on a grayscale basis whenever the captured image data for replay is received. The average of the RGB values is expressed by an average $R_{W(n)}$ of the R values of the red pixels in the identified region, an average $G_{W(n)}$ of the G values of the green pixels in the identified region, and an average $B_{W(n)}$ of the B values of the blue pixels in the identified region. The symbol n represents the grayscale "n". The brightness information is formed of $R_{W(n)}$, $G_{W(n)}$, and $B_{W(n)}$.

The brightness information generation section 245 subsequently uses $R_{W(n)}$, $G_{W(n)}$, and $B_{W(n)}$ to estimate the RGB characteristics of the projector 1.

Figure 11:
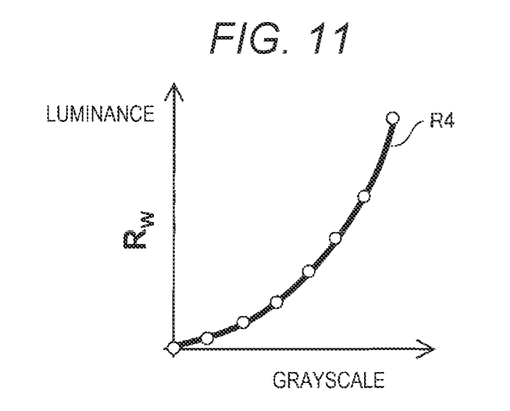
FIG. 11 shows an example of a grayscale-to-luminance characteristic.
Figure 12:
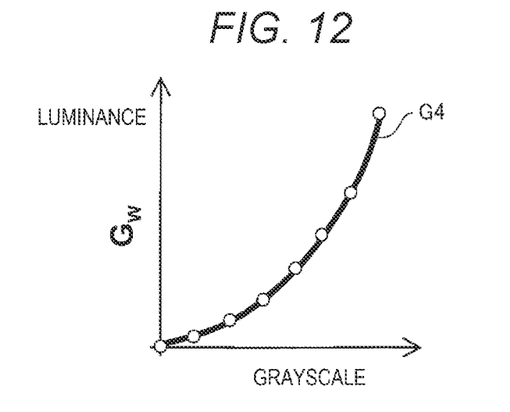
FIG. 12 shows another example of the grayscale-to-luminance characteristic.
Figure 13:
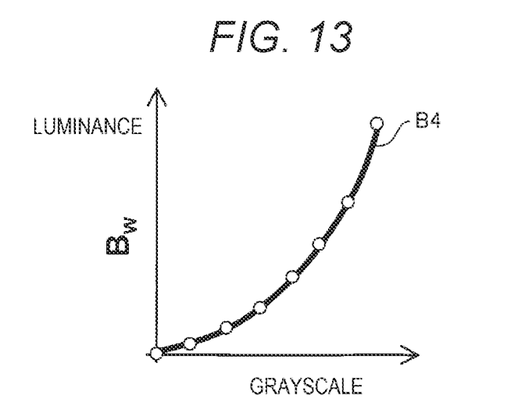
FIG. 13 shows another example of the grayscale-to-luminance characteristic.

The RGB characteristics of the projector 1 is expressed by a grayscale-to-luminance characteristic R4 of the liquid crystal light valve 145R for red light, a grayscale-to-luminance characteristic G4 of the liquid crystal light valve 145G for green light, and a grayscale-to-luminance characteristic B4 of the liquid crystal light valve 145B for blue light.

FIG. 11 shows an example of the grayscale-to-luminance characteristic R4. The brightness information generation section 245 uses $R_{W(n)}$ to estimate the grayscale-to-luminance characteristic R4. FIG. 12 shows an example of the grayscale-to-luminance characteristic G4. The brightness information generation section 245 uses $G_{W(n)}$ to estimate the grayscale-to-luminance characteristic G4. FIG. 13 shows an example of the grayscale-to-luminance characteristic B4. The brightness information generation section 245 uses $B_{W(n)}$ to estimate the grayscale-to-luminance characteristic B4.

A9: Example of Generation of Color Correction Data

An example of the generation of the color correction data will next be described. The color correction data generation section 242 uses the RGB characteristics of the projector 1 to calculate the color correction data, which causes the balance among the brightness of the red light, the brightness of the green light, and the brightness of the blue light at an arbitrary grayscale to approach a target balance. Specifically, the color correction data generation section 242 calculates the color correction data in such a way that the balance among $R_{W(n)}$, $G_{W(n)}$, and $B_{W(n)}$ is the target balance.

The color correction data generation section 242 first calculates temporary post-correction luminance values with respect to the luminance of the pixels in the liquid crystal light valve 145G for green light at the maximum grayscale of "7", specifically, a temporary post-correction luminance value $R_{W(7)}'$ of the pixels in the liquid crystal light valve 145R for red light, a temporary post-correction luminance value $G_{W(7)}'$ of the pixels in the liquid crystal light valve 145G for green light, and a temporary post-correction luminance value $B_{W(7)}'$ of the pixels in the liquid crystal light valve 145B for blue light as follows.

$$R_{W(7)}'=G_{W(7)}'*\alpha$$

$$G_{W(7)}'=G_{W(7)}$$

$$B_{W(7)}'=G_{W(7)}'*\beta$$

The symbol $\alpha$ is a target value of the ratio of the luminance value of the pixels in the liquid crystal light valve 145R for red light to the luminance value of the pixels in the liquid crystal light valve 145G for green light. The symbol $\beta$ is a target value of the ratio of the luminance value of the pixels in the liquid crystal light valve 145B for blue light to the luminance value of the pixels in the liquid crystal light valve 145G for green light.

The symbols $\alpha$ and $\beta$ are an example of target information on the balance among the brightness of the red light, the brightness of the green light, and the brightness of the blue light. The symbols $\alpha$ and $\beta$ express the ratio among the value of the brightness of the red light, the value of the brightness of the green light, and the value of the brightness of the blue light.

The symbols $\alpha$ and $\beta$ are each a fixed value determined in an adjustment step carried out before the shipment of the projector 1. The symbols $\alpha$ and $\beta$ are not limited to the fixed values determined in the adjustment step. For example, $\alpha$ and $\beta$ may instead be determined based on the balance among the brightness of the red light, the brightness of the green light, and the brightness of the blue light in part of the correction image being projected by the projector 1. Still instead, $\alpha$ and $\beta$ may be determined based on the balance among the brightness of the red light, the brightness of the green light, and the brightness of the blue light in an image projected by another projector adjacent to the projector 1. The symbols $\alpha$ and $\beta$ are stored in the second storage 23. The color correction data generation section 242 acquires $\alpha$ and $\beta$ from the second storage 23.

The temporary post-correction luminance value $R_{W(7)}'$ could be greater than $R_{W(7)}$. Similarly, the temporary post-correction luminance value $B_{W(7)}'$ could be greater than $B_{W(7)}$. The luminance value of the pixels in the liquid crystal light valve 145R ranging from for red light at the maximum grayscale of "7" cannot typically be greater than $R_{W(7)}$. Similarly, the luminance value of the liquid crystal light valve 145B for blue light at the maximum grayscale of "7" cannot typically be greater than $B_{W(7)}$.

The color correction data generation section 242 therefore calculates a post-correction luminance value $R_{W(7)}''$ of the pixels in the liquid crystal light valve 145R for red light, a post-correction luminance value $G_{W(7)}''$ of the pixels in the liquid crystal light valve 145G for green light, and a post-correction luminance value $B_{W(7)}''$ of the pixels in the liquid crystal light valve 145B for blue light as follows in such a way that the post-correction luminance value $R_{W(7)}''$ is smaller than or equal to $R_{W(7)}$, the post-correction luminance value $G_{W(7)}''$ is smaller than or equal to $G_{W(7)}$, and the post-correction luminance value $B_{W(7)}''$ is smaller than or equal to $B_{W(7)}$.

$$R_{W(7)}''=R_{W(7)}'/M$$

$$G_{W(7)}''=G_{W(7)}'/M$$

$$B_{W(7)}''=B_{W(7)}'/M$$

It is noted that M is the maximum of the following three values.

$$R_{W(7)}'/R_{W(7)}$$

$$G_{W(7)}'/G_{W(7)}$$

$$B_{W(7)}'/B_{W(7)}$$

The value calculated by $G_{W(7)}'/G_{W(7)}$ is 1.

Figure 14:
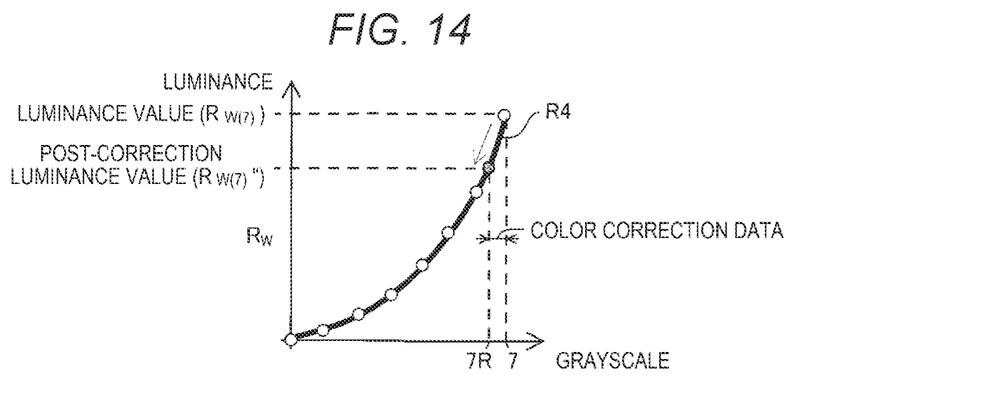
FIG. 14 shows a grayscale-to-luminance characteristic and the relationship between a post-correction luminance value and the post-correction grayscale and between a luminance value and a maximum grayscale.

The color correction data generation section 242 subsequently uses the grayscale-to-luminance characteristic R4 shown in FIG. 11 to calculate a post-correction grayscale "7R," which leads to the post-correction luminance value $R_{W(7)}''$. FIG. 14 shows the grayscale-to-luminance characteristic R4 and the relationship between the post-correction luminance value $R_{W(7)}''$ and the post-correction grayscale "7R" and between the luminance value $R_{W(7)}$ and the maximum grayscale of "7". The color correction data generation section 242 subsequently calculates a difference "7-7R" between the maximum grayscale of "7" and the post-correction grayscale "7R" as the color correction data on the R signal at the maximum grayscale of "7".

The color correction data generation section 242 subsequently calculates the color correction data on the G signal at the maximum grayscale of "7" and the color correction data on the B signal at the maximum grayscale of "7", as in the case of the color correction data on the R signal at the maximum grayscale of "7".

The color correction data generation section 242 subsequently calculates a post-correction luminance value $R_{W(n)}''$ of the pixels in the liquid crystal light valve 145R for red light, a post-correction luminance value $G_{W(n)}''$ of the pixels in the liquid crystal light valve 145G for green light, and a post-correction luminance value $B_{W(n)}''$ of the pixels in the liquid crystal light valve 145B for blue light at an intermediate grayscale "n".

$$G_{W(n)}'' = G_{W(7)}'' * (n/7)^{2.2}$$

$$R_{W(n)}'' = G_{W(n)}'' * \alpha$$

$$B_{W(n)}'' = G_{W(n)}'' * \beta$$

The index "2.2" is a value resulting from the γ characteristic. The index is therefore not limited to "2.2" and can be chanted as appropriate in accordance with the γ characteristic of the liquid crystal light valves 145. The intermediate grayscale "n" includes the grayscales ranging from "1" to "6". Since no correction is made at the grayscale of "0", the intermediate grayscale "n" does not include the grayscale of "0".

Figure 15:
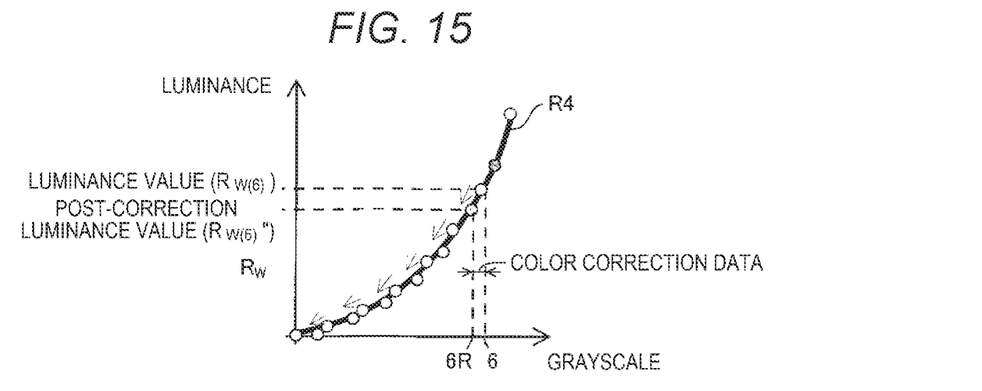
FIG. 15 shows another grayscale-to-luminance characteristic and the relationship between a post-correction luminance value and a post-correction grayscale and between a luminance value and an intermediate grayscale.

The color correction data generation section 242 subsequently calculates the color correction data on the R signal at an intermediate grayscale "n", the color correction data on the G signal at an intermediate grayscale "n", the color correction data on the B signal at an intermediate grayscale "n", and the color correction data on the R signal at the maximum grayscale "7". FIG. 15 shows the grayscale-to-luminance characteristic R4 and the relationship between the post-correction luminance value $R_{W(6)}''$ and the post-correction grayscale "6R" and between the luminance value $R_{W(6)}$ and the intermediate grayscale of "6". In the example shown in FIG. 15, the color correction data generation section 242 calculates a difference "6-6R" between the intermediate grayscale of "6" and the post-correction grayscale "6R" as the color correction data on the R signal at the intermediate grayscale of "6".

The color correction data generation section 242 further calculates grayscales other than the grayscales at which the color correction data have been calculated, for example, the color correction data at a grayscale of "1.5" based on interpolation computation using the calculated color correction data.

The color correction data generation section 242 further matches the range of the grayscales in the color correction data with the range of the grayscales in the projection image information. For example, when the minimum grayscale is "0" and the maximum grayscale is "255" in the projection image information, the color correction data generation section 242 changes the range of the grayscales in the color correction data from the range from "0" to "7" to the range from "0" to "255".

The brightness information generation section 245 and the color correction data generation section 242 may perform the operation described above on one or more regions different from the identified region in the white image. In this case, the color correction data can be generated on a region basis. Using the color correction data on a region basis allows reduction in the color unevenness in an image, whereby the white balance of the entire image is allowed to approach a target balance.

A10: Example of Color Correction

An example of the color correction using generated color correction data in the projector 1 will next be described. The image quality correction section 173 outputs, for example, the projection image information, which is formed of the RGB signals representing, for example, a movie, to the image processing section 141. The projection image information represents the grayscales of each of the RGB components. The image quality correction section 173 subsequently causes the image processing section 141 to correct the projection image information based on the color correction data.

In this case, the image processing section 141 first identifies the grayscales of the signals R, G, and B contained in the projection image information. The image processing section 141 subsequently subtracts the color correction data corresponding to the grayscales of the R signal from the grayscales of the R signal to generate the R signal after the correction. The image processing section 141 subsequently subtracts the color correction data corresponding to the grayscales of the G signal from the grayscales of the G signal to generate the G signal after the correction. The image processing section 141 subsequently subtracts the color correction data corresponding to the grayscales of the B signal from the grayscales of the B signal to generate the B signal after the correction. The image processing section 141 subsequently generates the drive signal based on post-correction RGB signals formed of the R signal after the correction, the G signal after the correction, and the B signal after the correction. The colors of the projection image indicated by the projection image information are therefore corrected from colors indicated by the projection image information before the correction to colors indicated by the projection image information after the correction.

The operation method and the control apparatus 2 according to the disclosure described above can shorten the period required for the generation of the color correction data as compared with the configuration in which the projector 1 projects a red image, a green image, and a blue image at timings different from one another to generate the color correction data.

The color correction data generation section 242 generates the color correction data based on the relationship of α and β, which are the target information on the balance among the brightness of the red light, the brightness of the green light, and the brightness of the blue light, with the brightness information. According to the aspect described above, the target information can be used to generate the color correction data.

The symbols α and β, which are the target information, represent the ratio among a value relating to the brightness of the red light, a value relating to the brightness of the green light, and a value relating to the brightness of the blue light. According to the aspect described above, the ratio among the brightness of the red light, the brightness of the green light, and the brightness of the blue light is allowed to approach a target balance.

The correction control section 243 provides the projector 1 with the color correction data. According to the aspect described above, the projector 1 can correct the colors of a projection image by using the color correction data.

B: Variations

Aspects of variations of the embodiment presented above by way of example will be presented below by way of example. Two or more aspects arbitrarily selected from those presented below by way of example may be combined with each other as appropriate to the extent that the aspects to be combined with each other do not contradict each other.

B1: First Variation

In the first embodiment, the correction image is not limited to a white image. For example, the correction image is generated by the red light, the green light, and the blue light and may instead be an image having a grayscale of the red light, a grayscale of the green light, and a grayscale of the blue light that are not all equal to one another. As an example, (R/G/B)=(255/36/255) or (36/255/36) may be used to form the correction image.

B2: Second Variation

In the first embodiment, a second image generated by two of the red light, the green light, and the blue light and a third image containing one of the red light, the green light, and the blue light but excluding the two described above may be used as part of a plurality of correction images. As an example, the second image is generated by the red light and the greenlight, and the third image is generated by the blue light. As another example, the second image is generated by the red light and the green light, and the third image is generated by the blue light and the red light. As still another example, the second image is generated by the red light and the green light, and the third image is generated by the green light, which is not used to create the color correction data, as well as the blue light and the red light.

In this case, the projection control section 241 causes the projector 1 to project the second image on the display surface 3 and causes the projector 1 to project the third image on the display surface 3 when the second image is not projected. The projection control section 241 causes the imaging device 152 to capture an image of the second image on the display surface 3 via the bandpass filter 153 to generate first captured image data. The projection control section 241 causes the imaging device 152 to capture an image of the third image on the display surface 3 via the bandpass filter 153 to generate second captured image data. The brightness information generation section 245 generates the brightness information based on the first captured image data and the second captured image data. The color correction data generation section 242 generates the color correction data based on the brightness information.

According to the aspect described above, the color correction data can be generated by causing the projector 1 to project the second image and the third image. The period required for the generation of the color correction data can therefore be shortened as compared with the configuration in which the projector 1 projects a red image, a green image, and a blue image at timings different from one another to generate the color correction data.

B3: Third Variation

In the first embodiment and the first and second variations, the color correction data generation section 242 may convert the brightness information expressed by the values of the RGB components into XYZ values as follows $$\begin{pmatrix} X_R \\ Y_R \\ Z_R \end{pmatrix} = \begin{pmatrix} a \\ b \\ c \end{pmatrix} * R_W$$

$$\begin{pmatrix} X_G \\ Y_G \\ Z_G \end{pmatrix} = \begin{pmatrix} d \\ e \\ f \end{pmatrix} * G_W$$

$$\begin{pmatrix} X_B \\ Y_B \\ Z_B \end{pmatrix} = \begin{pmatrix} g \\ h \\ i \end{pmatrix} * B_W$$

The values a to i form a transformation matrix derived in advance in consideration of the color tone of a projected image and other factors.

In this case, the color correction data generation section 242 uses the brightness information expressed by the XYZ values to generate the color correction data. An approach of generating the color correction data by using the brightness information expressed by the XYZ values is, for example, based on the technology described in JP-A-2004-228948.

B4: Fourth Variation

In the first embodiment and the first to third variations, the liquid crystal light valves 145 are used as an example of the light modulator in the projector 1, and the light modulator is not limited to liquid crystal light valves and can be changed as appropriate. For example, the light modulator may be formed of three reflective liquid crystal panels. The light modulator may be formed of three digital mirror devices (DMDs). In place of liquid crystal panels or DMDs, a configuration capable of modulating the light outputted from the light source 144 is employable as the light modulator.

What is claimed is:
1. A method for operating a control apparatus that controls a projector that generates red light, green light, and blue light, the method comprising:
 causing the projector to project a first image generated by the red light, the green light, and the blue light on a display surface;
 generating brightness information representing brightness of the red light, brightness of the green light, and brightness of the blue light based on captured image data generated by causing an image sensor to capture an image of the first image that is a white image including the red light, the green light and the blue light on the display surface via a bandpass filter that transmits the red light, the green light, and the blue light separately from one another; and
 generating color correction data for correcting colors of an image projected by the projector based on the brightness information,
 wherein the bandpass filter includes a first bandpass filter that transmits the red light, a second bandpass filter that transmits the green light, and a third bandpass filter that transmits the blue light, and
 a wavelength region of the light that the first bandpass filter transmits, a wavelength region of the light that the second bandpass filter transmits, and a wavelength region of the light that the third bandpass filter transmits are separate from one another.

2. The method for operating the control apparatus according to claim 1,
 wherein the color correction data is generated based on a relationship of target information with the brightness information.

3. The method for operating the control apparatus according to claim 2,
 wherein the target information represent a ratio among a value relating to the brightness of the red light, a value relating to the brightness of the green light, and a value relating to the brightness of the blue light.

4. The method for operating the control apparatus according to claim 1,
 wherein the color correction data is provided to the projector.

5. A method for operating a control apparatus that controls a projector that generates red light, green light, and blue light, the method comprising:
- causing the projector to project a first image on a display surface;
- causing the projector to project a second image on the display surface when the first image is not projected;
- generating brightness information representing brightness of the red light, brightness of the green light, and brightness of the blue light based on first captured image data generated by causing an image sensor to capture an image of the first image on the display surface via a bandpass filter that transmits the red light, the green light, and the blue light separately from one another and second captured image data generated by causing the image sensor to capture an image of the second image on the display surface via the bandpass filter; and
- generating color correction data for correcting colors of an image projected by the projector based on the brightness information,
- wherein the bandpass filter includes a first bandpass filter that transmits the red light, a second bandpass filter that transmits the green light, and a third bandpass filter that transmits the blue light,
- a wavelength region of the light that the first bandpass filter transmits, a wavelength region of the light that the second bandpass filter transmits, and a wavelength region of the light that the third bandpass filter transmits are separate from one another,
- the first image contains two of the red light, the green light, and the blue light, and
- the second image contains one of the red light, the green light, and the blue light excluding the two of the red light, the green light, and the blue light which are contained the first image.

6. The method for operating the control apparatus according to claim 5,
- wherein the color correction data is generated based on a relationship of target information with the brightness information.

7. The method for operating the control apparatus according to claim 6,
- wherein the target information represent a ratio among a value relating to the brightness of the red light, a value relating to the brightness of the green light, and a value relating to the brightness of the blue light.

8. The method for operating the control apparatus according to claim 5,
- wherein the color correction data is provided to the projector.

9. A projector comprising:
- a light source;
- a light modulator that includes a first light modulator that modulates red light from the light source, a second light modulator that modulates green light from the light source, and a third light modulator that modulates blue light from the light source and generates image light;
- a projection system that projects the image light generated by the light modulator on a display surface;
- a camera that includes a bandpass filter and captures an image of the display surface on which the image light is projected to generate captured image data; and
- a processor that calculates a luminance-to-chromaticity characteristic of the light modulator based on the captured image data and calculates a color correction value,
- wherein the camera captures an image of the display surface on which the image light is projected that is a white image including the red light the green light, and the blue light via the bandpass filter with color components of the red light, the green light, and the blue light distinguished from one another to generate the captured image data.

* * * * *